(12) United States Patent
Bancel et al.

(10) Patent No.: US 7,788,506 B2
(45) Date of Patent: Aug. 31, 2010

(54) METHOD AND DEVICE FOR PROTECTING A MEMORY AGAINST ATTACKS BY ERROR INJECTION

(75) Inventors: Frédéric Bancel, Lamanon (FR); Nicolas Berard, Trets (FR)

(73) Assignee: STMicroelectronics SA, Montrouge (FR)

(*) Notice: Subject to any disclaimer, the term of this patent is extended or adjusted under 35 U.S.C. 154(b) by 1089 days.

(21) Appl. No.: 11/482,511

(22) Filed: Jul. 7, 2006

(65) Prior Publication Data

US 2007/0033467 A1 Feb. 8, 2007

(30) Foreign Application Priority Data

Jul. 8, 2005 (FR) .................................. 05 07309

(51) Int. Cl.
*G06F 11/30* (2006.01)
*G11C 29/04* (2006.01)
*G06F 11/00* (2006.01)

(52) U.S. Cl. .................... 713/193; 710/51; 714/701; 714/41; 714/42; 714/6; 714/52; 714/54; 714/719; 714/722; 714/702; 714/766

(58) Field of Classification Search .............. 713/193; 710/51; 327/1–99; 714/701, 41, 42, 6, 52, 714/54, 719, 722, 258, 264, 766

See application file for complete search history.

(56) References Cited

U.S. PATENT DOCUMENTS

| 4,541,091 | A | * | 9/1985 | Nishida et al. ............... 714/756 |
| 5,442,645 | A | * | 8/1995 | Ugon et al. .................. 714/736 |
| 5,802,592 | A | | 9/1998 | Chess et al. .................. 711/164 |
| 5,813,029 | A | * | 9/1998 | Klein .......................... 711/118 |
| 5,944,821 | A | * | 8/1999 | Angelo ......................... 726/22 |
| 6,901,552 | B1 | | 5/2005 | Fey et al. ..................... 714/800 |
| 7,313,724 | B1 | * | 12/2007 | Kekre et al. ................... 714/12 |
| 2002/0035695 | A1 | | 3/2002 | Riches et al. ................ 713/193 |
| 2003/0067472 | A1 | * | 4/2003 | Radke et al. ................. 345/558 |
| 2004/0064646 | A1 | * | 4/2004 | Emerson et al. ............. 711/131 |
| 2006/0123322 | A1 | * | 6/2006 | Leung et al. ................. 714/763 |
| 2006/0294299 | A1 | * | 12/2006 | Edirisooriya ................ 711/112 |

FOREIGN PATENT DOCUMENTS

| EP | 0 402 210 | | 6/1990 |
| EP | 503375 | A2 * | 9/1992 |
| EP | 0 727 785 | | 8/1996 |

* cited by examiner

*Primary Examiner*—Michael J Simitoski
(74) *Attorney, Agent, or Firm*—Lisa K. Jorgenson; Timothy L. Boller; Seed IP Law Group PLLC

(57) ABSTRACT

A method secures a memory in which individually read-accessible binary words are saved. The method includes defining a memory zone covering a plurality of words, calculating a cumulative signature according to all of the words in the memory zone, and storing the cumulative signature as an expected signature of the memory zone to check the integrity of data read in the memory. The method can be applied to the securing of smart cards.

31 Claims, 2 Drawing Sheets

Fig. 3
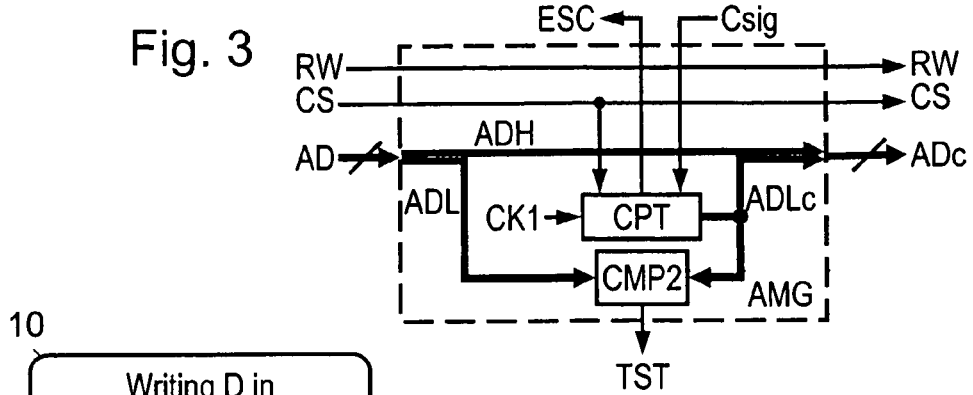
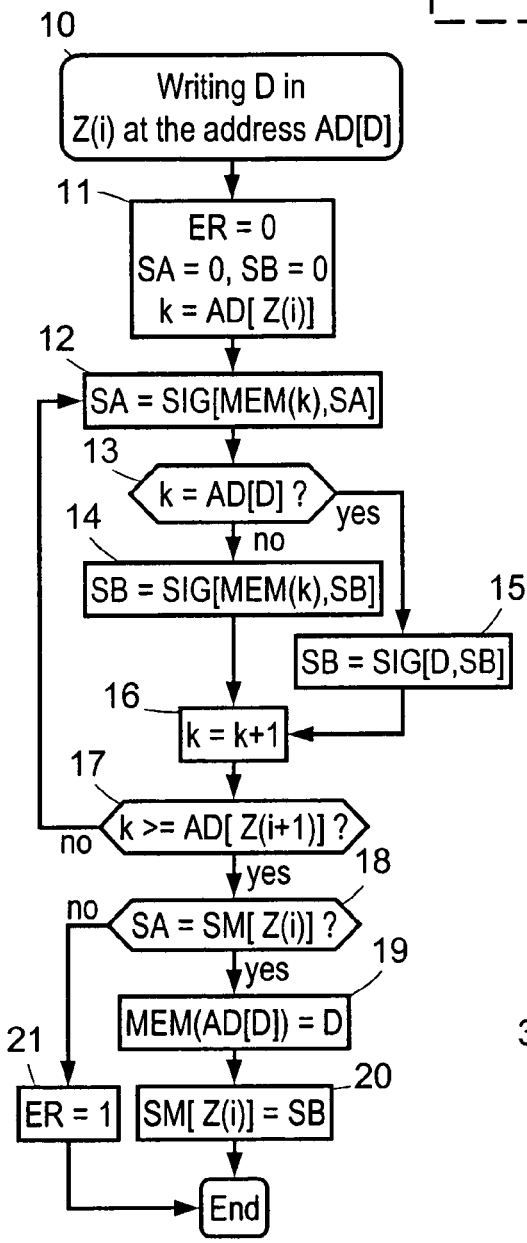
Fig. 4
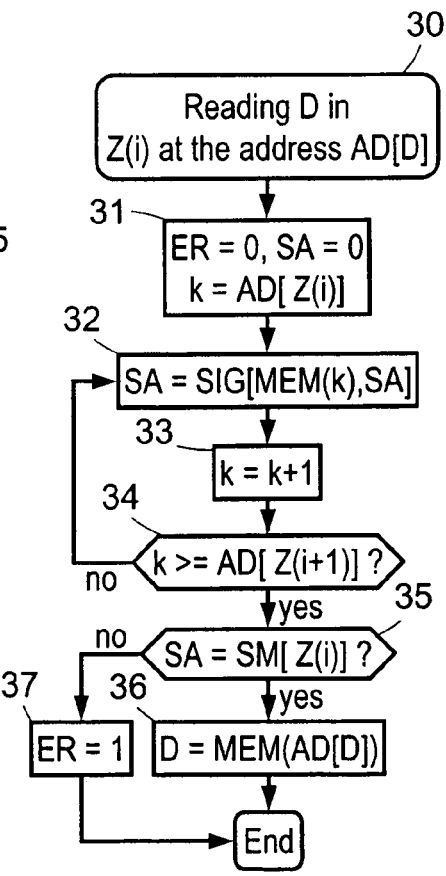
Fig. 5

METHOD AND DEVICE FOR PROTECTING A MEMORY AGAINST ATTACKS BY ERROR INJECTION

BACKGROUND OF THE INVENTION

1. Field of the Invention

The present invention relates to the protection of integrated circuits against attacks by error injection, and particularly to the protection of integrated circuits present in smart cards.

The present invention relates more particularly to a method for securing the writing and the reading of a memory.

It applies in particular, but not exclusively, to memories that are both read- and write-accessible, whether volatile like RAM memories, or non-volatile like EEPROM and FLASH memories.

2. Description of the Related Art

In recent years, techniques of hacking secured microprocessor integrated circuits have developed considerably. The most advanced hacking methods currently involve injecting errors at determined points of an integrated circuit during the execution of so-called sensitive operations, such as authentication operations or operations of executing a cryptography algorithm for example. Such attacks by error injection, also referred to as attacks by fault injection, enable, in combination with mathematical models, the structure of a hard-wired logic cryptography algorithm and/or the secret keys it uses to be deduced. The error injection can be done in various ways, by introducing glitches into the supply voltage of the integrated circuit, by introducing glitches into the clock signal of the integrated circuit, or by exposing the integrated circuit to radiations or to a laser beam, etc. RAM memories are particularly vulnerable to glitches.

U.S. Pat. No. 6,901,552 discloses a method of accessing a RAM memory wherein a parity or CRC (Cyclic Redundancy Check) control word is computed and memorized for each word or group of four words in the memory. When the memory is read, the control word is computed and compared with the memorized control word for the read word. If a difference is detected, an error signal is emitted. When the memory is written, the control word is checked. Then a new control word is computed and memorized for the word to be written, and the latter is stored in the memory.

The control word checking and the computation of a new control word appear to increase in an important manner the access times to the memory, especially the write access time. These access times become excessive if it is necessary to implement cumulative signature calculations which are more complex than parity or CRC calculations.

BRIEF SUMMARY OF THE INVENTION

One embodiment of the present invention protects a memory that is word-accessible against attacks aimed at changing the content of the memory. This is achieved by providing for performing integrity checks using cumulative signatures calculated on all of the words in one part of the memory.

One embodiment of the present invention provides a method for securing a data memory in which individually read-accessible binary words are saved, comprising defining in the memory at least one memory zone covering a plurality of words.

According to one embodiment, the writing of a new word in the memory zone comprises a prior step of reading all the words in an initial set of words present in the memory zone, and simultaneously calculating a first current cumulative signature and a second current cumulative signature as a function of the words read in the memory zone, the calculation of the second current signature comprising replacing on-the-fly with the new word, a word read that is intended to be replaced in the memory with the new word.

According to one embodiment, the writing of a new word in the memory zone further comprises a specific write-protect action triggered if the current cumulative signature does not correspond to an expected signature.

According to one embodiment, the writing of a new word in the memory zone further comprises storing the second current cumulative signature as the expected signature of the memory zone.

According to one embodiment, the specific write-protect action comprises at least one of the following actions or a combination of the following actions: preventing the writing of the new word in the memory, preventing the storing of a new current cumulative signature as expected signature, activating an alert signal, read- and/or write-disabling the memory, or erasing the content of the memory zone.

According to one embodiment, the new current cumulative signature is calculated before the new word is written in the memory zone.

According to one embodiment, the word read is replaced with the new word by means of a multiplexer circuit arranged in a private path for reading words and having a first input linked to a read output of the memory and a second input linked to the output of a storing buffer for storing the new word.

According to one embodiment, the reading of a word in the memory zone comprises reading all of the words in the initial set of words present in the memory zone, calculating a current signature according to all of the words read in the initial set of words, and triggering a specific read-protect action if the current signature does not correspond to an expected signature.

According to one embodiment, the specific read-protect action comprises at least one of the following actions or a combination of the following actions: not supplying the word read in the memory to the external environment of the memory, activating an alert signal, read- and/or write-disabling the memory, or erasing the content of the memory zone.

According to one embodiment, the cumulative signatures are calculated with an invariable signature generation algorithm, or an algorithm using an invariable signature key, such that a current signature corresponds to an expected signature if the two signatures are identical.

According to one embodiment, the words in the memory zone are read during the calculation of current cumulative signatures, at a faster rate than the rate of writing or reading a word in the memory.

One embodiment of the present invention is a device for securing a data memory in which individually read-accessible binary words are stored, comprising means for locating at least one memory zone of the memory covering a plurality of words, means for reading all the words of an initial set of words present in the memory zone, and a first signature calculation circuit to calculate a first current cumulative signature as a function of the words read in the memory zone.

According to one embodiment, the device is arranged for intercepting a command for writing a new word in the memory zone and comprises a second signature calculation circuit for calculating a second current cumulative signature as a function of the word read in the memory zone, and means for applying when a new word is written in the memory zone the words read simultaneously to the first signature calculation circuit for calculating the first current cumulative signature and to the second signature calculation circuit for calculating the second current cumulative signature by replacing on-the-fly with the new word, a word read that is intended to be replaced in the memory with the new word.

According to one embodiment, the device comprises means for storing the second current signature as expected signature of the memory zone.

According to one embodiment, the device further comprises means for triggering a specific write-protect action to write-protect the memory if the current signature does not correspond to an expected signature.

According to one embodiment, the specific write-protect action comprises at least one of the following actions or a combination of the following actions: preventing the writing of the new word in the memory, preventing the storing of a new current signature as expected signature, activating an alert signal, disabling the memory or erasing the content of the memory zone.

According to one embodiment, the new current signature is calculated before writing the new word in the memory zone.

According to one embodiment, the device comprises a storing buffer for storing the new word to be saved in the memory, a storing means for storing the address in the memory of the new word to be saved, an address counter for scanning the addresses of all of the words in the initial set of words, and for applying the scanned address to the memory as read address, a comparison circuit for comparing the scanned address applied to the memory and the address of the new word to be saved, and a multiplexer circuit comprising a first input linked to a read output of the memory, a second input linked to the output of the storing buffer, an output linked to the second signature circuit, and a control input controlled by the comparison circuit, such that the multiplexer circuit replaces with the new word, at the input of the second signature circuit, the word intended to be replaced in the memory, when the read address supplied by the address counter is equal to the address of the new word to be saved.

According to one embodiment, the device is arranged for intercepting a command for reading a word in the memory zone applied to the memory, and for performing, prior to supplying the word to be read, the following operations: reading all of the words in the initial set of words present in the memory zone, applying the words read to the first signature calculation circuit to calculate a current cumulative signature according to the words read, and triggering a specific read-protect action if the current signature does not correspond to an expected signature.

According to one embodiment, the specific read-protect action comprises at least one of the following actions or a combination of the following actions: not supplying the word read in the memory to the external environment of the memory, activating an alert signal, disabling the memory or erasing the content of the memory zone.

According to one embodiment, the cumulative signatures are calculated with an invariable signature generation algorithm, or an algorithm using an invariable signature key, such that a current signature corresponds to an expected signature if the two signatures are identical.

According to one embodiment, the memory zone is scanned during the current cumulative signature calculation, at a faster rate than the rate of writing or reading a word in the memory.

BRIEF DESCRIPTION OF THE SEVERAL VIEWS OF THE DRAWINGS

These and other features and advantages of the present invention will be explained in greater detail in the following description of some embodiments of the present invention given in relation with, but not limited to, the following figures:

FIG. 3 represents an address management circuit of the device in FIG. 2;

FIGS. 4 and 5 are flowcharts showing a method for securing a memory, according to the present invention.

DETAILED DESCRIPTION OF THE INVENTION

Figure 1:
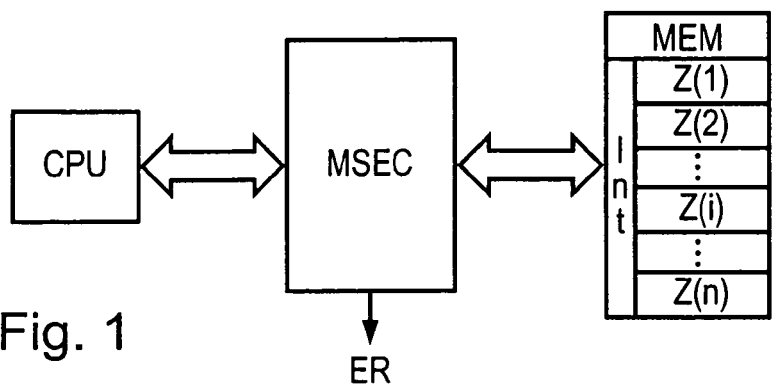
FIG. 1 represents in block form a processing system comprising a memory and a device for securing the memory, according to the present invention.

FIG. 1 represents a device MSEC for securing a memory MEM, according to one embodiment of the present invention, arranged between the memory MEM and circuits using the memory, such as a processing unit CPU. The memory is of word-accessible type, of 8, 16 or 32 bits for example, and is divided into zones $Z(1), Z(2), \ldots Z(i), \ldots Z(n)$. The device MSEC is connected to the memory and to the processing unit so as to intercept the orders for writing and reading the memory, sent by the processing unit. The device MSEC controls the memory to execute these orders and transmits the word read in response to an order for reading a word in the memory.

Figure 2:
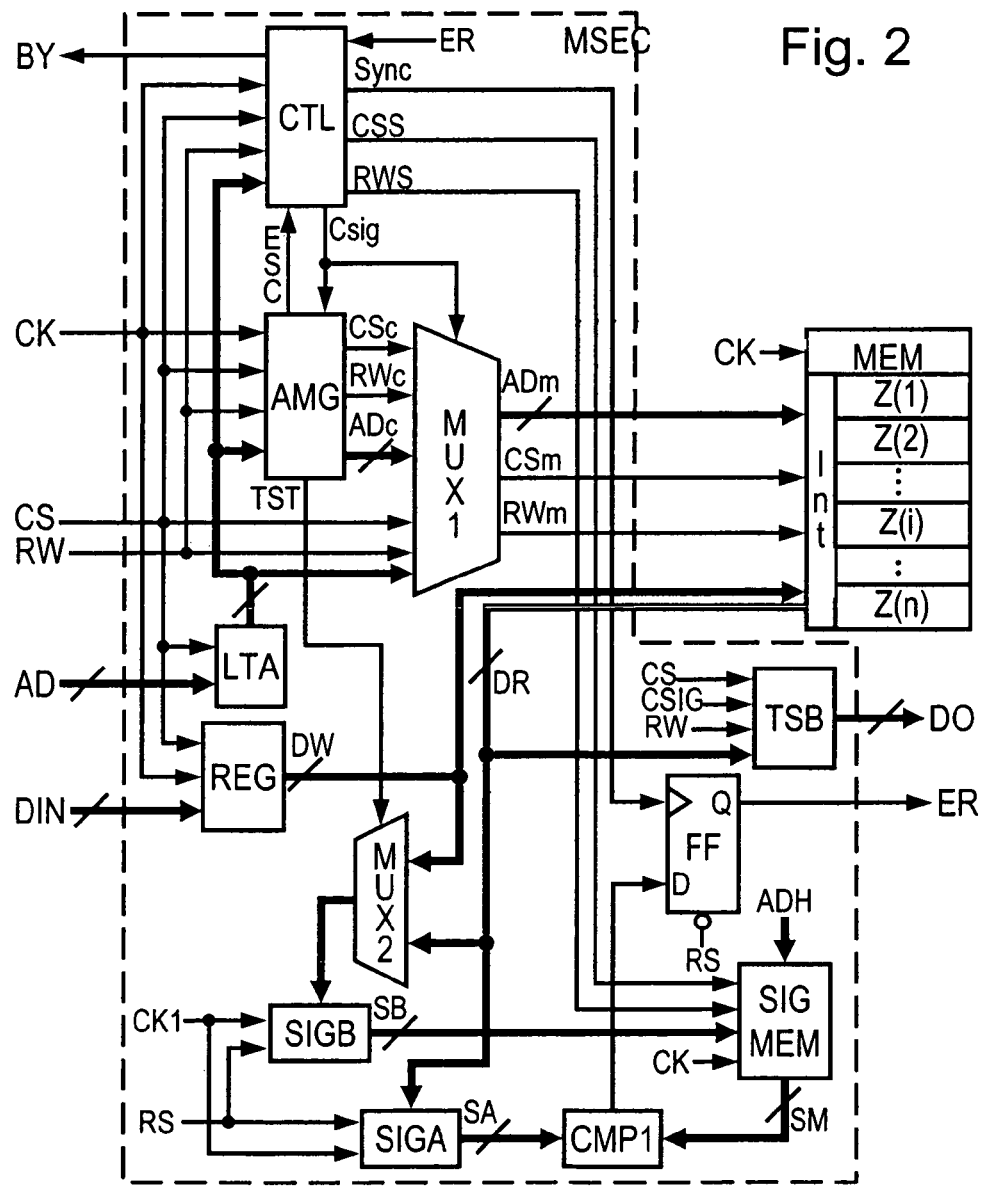
FIG. 2 represents a device for securing a memory, according to the present invention.

FIG. 2 represents an embodiment in hard-wired logic of the security device MSEC according to one embodiment of the present invention. The device MSEC comprises an address register LTA that keeps the address AD applied at input of the device MSEC instead of the memory MEM throughout an operation of accessing the memory, including the signature calculation. The address register LTA comprises for example D flip-flops or latches each storing bits constituting the address AD applied at input of the device MSEC.

The device MSEC comprises an address management circuit AMG comprising inputs receiving activation signals CS and read or write selection signals RW, received by the security device MSEC instead of the memory MEM, and an address input connected to the address register LTA.

The device MSEC comprises a first multiplexer MUX1 comprising two groups of inputs. The inputs of a first group of inputs are respectively connected to the inputs of signals for activating CS and read- or write-selecting RW the device MSEC, and to the address register LTA. The inputs of the second group of inputs are connected to address outputs ADc, activation outputs CSc, and read or write selection outputs RWc of the address management circuit AMG. The multiplexer MUX1 comprises address outputs ADm, activation outputs CSm and read or write selection outputs RWm, connected to an interface Int of the memory MEM.

The security device MSEC further comprises a first signature calculation circuit SIGA to calculate a current signature. A word input of the signature calculation circuit SIGA receives the words DR read in the memory MEM. The signature calculation circuit SIGA comprises an output connected to a comparator CMP1 which compares the current signature calculated by the circuit SIGA with an expected signature SM stored in a signature storage memory SIGMEM. An expected signature is selected in the signature storage memory SIGMEM using the most significant bits ADH of the address AD applied at input of the device MSEC. The output of the comparator CMP1 is connected to the D input of a flip-flop FF comprising a clock signal input and a non-inverting Q output supplying an error indicator signal ER. The state of the signal ER corresponds to the state of the signal applied to the D input of the flip-flop following a pulse applied to the clock signal input of the flip-flop.

The words DR read in the memory MEM are applied to an output DO of the device MSEC through a tristate buffer TSB, in response to a read order intended for the memory. For this purpose, the buffer TSB receives the signals CS, RW, CSIG as control signals and copies at the output DO the words read in the memory MEM when these control signals indicate that the memory is read-selected and that the signature calculation is not active. In the opposite case, the output of the buffer is in the high impedance state, such that the data read in the memory MEM cannot be accessed at the output DO.

The device MSEC also comprises a control circuit CTL for controlling the address management circuit AMG, the signature storage memory SIGMEM and the flip-flop FF. The control circuit CTL comprises inputs respectively receiving the activation signals CS, and the read or write selection signals RW, applied at input of the device MSEC, and the address stored in the address register LTA. The control circuit applies a signature calculation activation signal Csig to the circuit AMG and to the selection input of the multiplexer MUX1, and receives an end of signature calculation signal ESC from the circuit AMG. The control circuit also applies a synchronization signal Sync to the clock signal input of the flip-flop FF, and activation CSS and read or write selection RWS signals to the memory SIGMEM. The control circuit manages a memory busy signal BY that is sent at output of the device MSEC.

Advantageously, the device MSEC comprises a second signature calculation circuit SIGB for calculating a new current signature. The circuit SIGB receives the words DR read in the memory MEM through a second multiplexer MUX2, another input of which is connected to the word output DW of a word register REG. The output of the calculation circuit for calculating a new signature SIGB is connected to a word input of the signature storage memory SIGMEM. The multiplexer MUX2 comprises a selection input receiving a test result signal TST supplied by the circuit AMG. The word register REG comprises a word input connected to a word input DIN of the device MSEC, to which a word to be written in the memory MEM is applied. The word output DW of the register REG is also connected to an input for words to be written of the memory. The word register is for example made up of D flip-flops or latches.

A clock signal CK applied at input of the device MSEC is distributed to the memory MEM, to the signature storage memory SIGMEM, to the register REG, and to the address management AMG and control CTL circuits.

One embodiment of the address management circuit AMG is represented in FIG. 3. In this Figure, the circuit AMG comprises a counter CPT that is initialized upon a change of state of the read or write selection signal RW applied at input of the address management circuit. The counter CPT is triggered upon a change of state of the signature activation signal Csig sent by the control circuit CTL. The counter CPT is designed to successively generate, at an output ADLc, all of the addresses of a memory zone Z(i). At its address output ADc, the circuit AMG supplies an address the most significant bits of which correspond to the most significant bits ADH of the address applied at input of the address management circuit, and the least significant bits of which are supplied by the output ADLc of the counter CPT. The counting frequency is supplied by a clock signal CK1 that is for example the clock signal CK applied at input of the circuit AMG.

Preferably, the frequency of the counting clock signal is a multiple of the frequency of the clock signal CK applied at input of the address management circuit, so as to read the words of a memory zone Z(i) more rapidly when calculating the signature of this memory zone. In this case, the clock signal CK1 must also be applied to the signature calculation circuits SIGA and SIGB to synchronize the signature calculation with the scanning of the memory zone Z(i).

When the last address of the memory zone Z(i) is reached, the counter CPT supplies an end of counting signal that is applied on the end of signature calculation signal output ESC of the address management circuit AMG.

Furthermore, the circuit AMG comprises a comparator CMP2 a first input of which receives the least significant bits ADL of the address applied at input of the address management circuit, and a second input of which is connected to the output ADLc of the counter. The comparator CMP2 supplies a signal representative of the result of the comparison at the output TST of the address management circuit. This signal indicates whether or not the address ADc at output of the circuit AMG corresponds to the address AD stored in the address register LTA.

The expected signatures of the memory zones Z(i) are calculated and stored in the signature storage memory SIGMEM, when the device MSEC is initialized for example. The signature calculation circuits SIGA and SIGB are initialized at the beginning of a signature calculation by an initialization signal RS that can be the memory activation signal CS or the signal Csig. The initialization signal is also applied to the initialization input of the flip-flop FF, in order to initialize the state of the flip-flop.

Upon receiving a write order, a word to be saved DIN and a write address are respectively present at the word DIN and address AD inputs of the security device MSEC, and the signals for activating CS and read or write selecting RW the device are respectively on 1 and 0. The word to be saved, which is present at the word input DIN, is stored in the word register REG. Similarly, the address present at the address input AD is stored in the address register LTA. The control circuit CTL triggers the signature calculation, using the signal Csig applied to the address management circuit AMG and to the multiplexer MUX1. The multiplexer MUX1 then selects the outputs ADc, RWc and CSc of the circuit AMG and applies them to the interface Int of the memory MEM.

In parallel, when the signal Csig changes state, the counter CPT of the circuit AMG is activated and scans the memory zone Z(i), successively supplying at each cycle of the clock signal CK1 the address ADc of all of the words in the zone Z(i) to which the write address stored in the address register LTA belongs. The zone Z(i) is selected by the most significant bits ADH of the address applied at input AD of the device MSEC. Then, at its word output DR, the memory MEM successively supplies all of the words saved in the memory zone Z(i) to the signature calculation circuits SIGA, SIGB. During the scanning of the words of the memory zone Z(i), when the address ADc generated by the counter CPT of the management circuit AMG is equal to the address AD present at the input of the device MSEC, the signal TST at output of the address management circuit changes state and controls the multiplexer MUX2 so that the latter applies at input of the signature calculation circuit SIGB, not the word read in the memory, but the word stored in the register REG. At the next cycle of the clock signal CK1, the signal TST changes state, such that the next words, read in the memory zone Z(i), are applied to the signature calculation circuit SIGB. Thus, the memory zone Z(i) is only read once to simultaneously calculate the current signature SA and the new current signature SB, the word read in the memory zone at the write address being replaced on-the-fly by the word to be written to calculate the new signature SB.

At the end of the counting performed by the counter CPT, the signature calculation circuits SIGA and SIGB respectively supply the current signature SA of the memory zone Z(i), i.e., representative of the current content of the memory zone, and a new current signature SB of the memory zone in which the word to be saved, appearing in the word register REG, replaces the word appearing in the memory MEM at the write address supplied by the address register LTA. The new current signature SB is thus representative of the content of the memory zone as it will be after writing the word to be saved at the write address.

Also at the end of the counting, the address management circuit AMG sends the end of signature calculation signal ESC to the control circuit CTL. Upon receiving this signal, the circuit CTL controls the signature storage memory SIGMEM using selection CSS and read RWS signals for reading the expected signature SM of the memory zone Z(i), and applies the synchronization signal Sync to the flip-flop FF. The current signature SA coming from the signature calculation circuit SIGA and the expected signature SM read in the signature storage memory SIGMEM are then applied to the inputs of the comparator CMP1.

The control circuit CTL changes the state of the signal Csig to control the multiplexer MUX1 so as to apply to the interface Int of the memory MEM the signals CS and RW applied at input of the device MSEC, and the address stored in the address register LTA. Thus, the word appearing in the register REG is saved in the memory MEM. The control circuit also controls the signature storage memory SIGMEM using the signals CSS and RWS so as to save the new current signature SB therein as expected signature SM of the memory zone Z(i). The write address in the memory SIGMEM is given by the most significant bits ADH of the address stored in the address register LTA.

If one or more words saved in the memory zone Z(i) have undergone an alteration, the current signature SA supplied by the signature calculation circuit SIGA is different from the expected signature SM read in the signature memory. In this case, the output signal of the comparator CMP1 indicates a signature error and causes a state change of the flip-flop FF following the application of the synchronization signal Sync. The indicator signal ER at output of the device MSEC then indicates an error.

In the opposite case, if the current signature SA is equal to the expected signature SM read in the signature storage memory SIGMEM, the output signal of the comparator CMP1 does not indicate any error and does not trigger any state change of the flip-flop FF.

The writing of the word in the memory MEM, and the update of the signature storage memory SIGMEM can be done systematically, even in the event of an error detection, given that the error indicator signal ER supplied by the device MSEC can for example trigger the activation of an alarm signal, the erasure of the memory zone Z(i) or of the entire memory MEM, or even the read- and/or write-disabling of the memory. Alternatively, the error indicator signal ER is applied at input of the control circuit CTL which does not control the writing of the word in the memory and the updating of the signature memory if the signal ER indicates an error.

Upon receiving an order for reading a word in the memory MEM, a read address is present at the input AD of the device MSEC and stored in the address register LTA. The input signals CS and RW of the device are on 1. These signals are applied to the memory MEM by the multiplexer MUX1. The memory MEM then supplies the word read on the output DO of the device.

Before or after the execution of the order for reading the memory MEM, the control circuit CTL controls the address management circuit AMG and the multiplexer MUX1 to calculate a signature of the memory zone Z(i) in which the address read is located. The signature is calculated in the same way as during the execution of a write order. At the end of the signature calculation, the current signature SA supplied by the signature calculation circuit SIGA and the expected signature SM of the memory zone Z(i) are applied to the input of the comparator CMP1. According to the result of the comparison performed by the comparator CMP1, the error indicator signal ER at output of the device MSEC indicates an error or not.

It shall be noted that during the execution of an order for reading the memory MEM, the second signature calculation circuit SIGB also produces a signature SB, but the latter is not saved in the memory SIGMEM.

The memory busy signal BY generated by the control circuit CTL is in the busy state during the execution of write and read orders and during the corresponding signature calculations, to indicate to the processing unit CPU accessing the memory MEM that the latter is busy and cannot execute new write or read orders.

The division of the memory MEM into memory zones Z(i) impacts both the size of the signature storage memory SIGMEM and the time required to calculate a signature. Indeed, the greater the number of memory zones, the smaller their size is, and the greater the number of expected signatures to be stored in the memory SIGMEM is. However, the time for calculating a signature will be all the shorter as the size of the memory zones is reduced.

FIGS. 4 and 5 respectively show a procedure of writing 10 and a procedure of reading 30 in a memory MEM in accordance with the method according to one embodiment of the present invention. These procedures are respectively executed by a security device comprising a processing unit, at each write and read access to an address AD[D] in a zone Z(i) of the memory, D being a word to be read or to be written in the memory.

In the first step 11 of the procedure of writing 10 the word D, an error indicator ER is initialized at a value indicating that no error has been detected. The device MSEC also initializes the value k of a counter at the start address AD[Z(i)] of the memory zone Z(i), as well as variables SA, SB provided for respectively receiving the cumulative values of a current signature and of a new current signature of the zone Z(i).

In the next step 12, the device MSEC calculates the next value of the current cumulative signature SA using the previous value of the current cumulative signature SA and of the word MEM(k) read in the memory at the address given by the value k of the counter. In the next step 13, the device MSEC compares the value k of the counter with the write address AD[D] of the word D to be written in the memory zone Z(i). If the value k of the counter is different from the write address, the device MSEC calculates the next value of the new current signature SB using the previous value of the signature SB and of the word MEM(k) previously read in the memory. On the other hand, if the value k of the counter is equal to the write address, the next cumulative value of the new current signature SB is calculated using the previous value of the new signature and the value of the word D to be written in the memory. The word D to be written in the memory zone Z(i) thus replaces the word saved in the memory at the write address in the calculation of the signature SB.

In the next step 16, the value k of the counter is incremented by 1 to point on the word saved at the next address in the memory zone Z(i). In the next step 17, the device MSEC tests whether the end of the memory zone Z(i) is reached, for example by comparing the value k of the counter with the start address of the next zone Z(i+1). If the end of the memory zone Z(i) is not reached, the procedure continues at step 12 where the device MSEC calculates the next values of the current cumulative signature SA and of the new cumulative signature SB. In the opposite case, the procedure continues at step 18, during which the device MSEC reads the expected signature SM[Z(i)] of the memory zone Z(i) in a memory zone SIGMEM reserved for storing signatures, and compares the current signature SA obtained with the expected signature read. If the current signature SA is equal to the expected signature, the device MSEC saves the word D in the memory zone Z(i) at the address AD[D] and the expected signature of the memory zone Z(i) is updated in the memory zone SIGMEM with the value of the new cumulative signature SB. On the other hand, if the current signature SA is different from the expected signature, the value of the error indicator ER is changed to indicate an error.

The read procedure 30 takes place in a manner substantially identical to the write procedure 10, except that during the reading of a word in the memory the signature of the memory does not change. It is not therefore necessary to calculate a new current signature.

In the first step 31 of the read procedure 30 shown in FIG. 4, the security device MSEC initializes the error indicator ER at a value indicating that no error has been detected. It also initializes the value k of the counter at the start address AD[Z(i)] of the memory zone Z(i), and the value of the current cumulative signature SA.

In the next step 32, the device MSEC calculates the next value of the current cumulative signature SA using the previous value of the signature SA and the word MEM(k) read in the memory at the address given by the value k of the counter.

In the next step 33, the value k of the counter is incremented by 1 to point on the word situated at the next address in the memory. In the next step 34, the security device MSEC tests whether the end of the memory zone Z(i) is reached by the value k of the counter. If the end of the memory zone Z(i) is not reached, the procedure continues at step 32 where the next value of the current cumulative signature SA is calculated. In the opposite case, the procedure continues at step 35, during which the security device MSEC reads the expected signature SM[Z(i)] of the memory zone Z(i) in the memory zone SIGMEM, and compares the current signature SA with the expected signature. If the current signature SA is equal to the expected signature, the word D is read in the memory zone Z(i) at the address AD[D]. On the other hand, if the current signature SA is different from the expected signature, the value of the error indicator ER is changed to indicate an error.

It will be understood by those skilled in the art that various other alternative embodiments of the method and the device according to the present invention are possible, particularly concerning the measures taken when an inconsistency is detected between a current signature and an expected signature. Thus, it is not necessary to prevent the word from being written and the signature memory from being updated in the event that an inconsistency is detected between the expected signature and the current signature calculated.

The order of the operations of reading a word in the memory and of checking signatures can also be inverted. Thus, the word read can systematically be supplied to the processing unit, the signature checking merely producing a signal ER representative of a possible signature error that is then used by the processing unit connected to the device. In the event that a signature inconsistency is detected, any appropriate measure can thus be taken by the device or by the processing unit.

Furthermore, any type of word cumulative signature calculation algorithm can be used to determine the signature of a memory zone. Thus, the signature calculation algorithm can be invariable or use an invariable signature key. In one advantageous embodiment of the present invention, the size of the signatures obtained is identical to the size of the words, whether they comprise 8, 16 or 32 bits.

Generally, the comparison method applied by the signature comparator CMP1 is adapted to the signature calculation algorithm chosen, so as to detect the existence of a correspondence between the current signature and the expected signature revealing the absence of error. Indeed, depending on the algorithm chosen, two signatures may correspond and thus not reveal any error without necessarily being identical.

In addition, as it will be understood from the above description, all or part of the functions of the security device MSEC described above can be produced by software, i.e., using a programmed calculation unit, whether or not distinct from the processing unit CPU that accesses the memory MEM, or by logic circuits.

It is possible for the signature storage memory SIGMEM not to be a specific memory, but merely be a reserved memory zone of the memory MEM to be secured. In general, the memory SIGMEM can be internal or external to the security device MSEC.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A method for securing a data memory in which individually read-accessible binary words are saved, comprising:
    defining in the memory a memory zone covering a plurality of words;
    receiving a write request to write a new word in the memory zone;
    in response to receiving the write request, reading all words in a set of words present in the memory zone; and
    simultaneously calculating a first current cumulative signature and a second current cumulative signature as a function of the words read in the memory zone, the calculating of the second current cumulative signature comprising replacing on-the-fly with the new word, a write target word, of the words read, that is intended to be replaced in the memory with the new word, wherein the words in the memory zone are read during the calculating of the current cumulative signatures, at a faster rate than a rate of writing the write target word in the memory.

2. The method according to claim 1, wherein the writing of a new word in the memory zone further comprises storing the second current cumulative signature as an expected signature of the memory zone.

3. The method according to claim 1, further comprising triggering a specific write-protect action if the first current cumulative signature does not correspond to an expected signature.

4. The method according to claim 3, wherein the specific write-protect action comprises at least one of the following actions or a combination of the following actions: preventing the writing of the new word in the memory, preventing the storing of the second current cumulative signature as a new expected signature, activating an alert signal, read- and/or write-disabling the memory, and erasing the memory zone.

5. The method according to claim 1, wherein the second current cumulative signature is calculated before the new word is written in the memory zone.

6. The method according to claim 1, wherein the write target word is replaced with the new word using a multiplexer circuit arranged in a private path for reading words and having a first input linked to a read output of the memory and a second input linked to an output of a storing buffer for storing the new word.

7. The method according to claim 1, further comprising:
receiving a read request to read a read target word in the memory zone;
in response to receiving the read request, reading all of the words in the set of words present in the memory zone;
calculating the first current cumulative signature according to all of the words read in the set of words; and
triggering a specific read-protect action if the first current cumulative signature does not correspond to an expected signature.

8. The method according to claim 7, wherein the specific read-protect action comprises at least one of the following actions or a combination of the following actions: preventing the read target word from being supplied to an external environment of the memory, activating an alert signal, read- and/ or write-disabling the memory, or erasing the memory zone.

9. The method according to claim 1, wherein the cumulative signatures are calculated with an invariable signature generation algorithm, or an algorithm using an invariable signature key, such that the first current cumulative signature corresponds to an expected signature if the first current cumulative and expected signatures are identical.

10. A device for securing a data memory in which individually read-accessible binary words are stored, comprising:
means for locating a memory zone of the memory covering a plurality of words;
means for reading all words of a set of words present in the memory zone;
a first signature calculation circuit to calculate a first current cumulative signature as a function of the words read in the memory zone;
means for intercepting a command for writing a new word in the memory zone;
a second signature calculation circuit for calculating a second current cumulative signature as a function of the words read in the memory zone; and
means for simultaneously applying, in response to the write request, the words read to the first signature calculation circuit for calculating the first current cumulative signature and to the second signature calculation circuit for calculating the second current cumulative signature by replacing on-the-fly with the new word, a write target word, of the words read, that is intended to be replaced in the memory with the new word, wherein the memory zone is scanned during the current cumulative signature calculations, at a faster rate than a rate of writing the write target word in the memory.

11. The device according to claim 10, further comprising means for storing the second current cumulative signature as an expected signature of the memory zone.

12. The device according to claim 10, further comprising means for triggering a specific action to write-protect the memory if the first current cumulative signature does not correspond to an expected signature.

13. The device according to claim 12, wherein the specific write-protect action comprises at least one of the following actions or a combination of the following actions: preventing the writing of the new word in the memory, preventing the storing of a new current signature as expected signature, activating an alert signal, disabling the memory, and erasing the memory zone.

14. The device according to claim 10, wherein the second current cumulative signature is calculated before writing the new word in the memory zone.

15. The device according to claim 10, further comprising:
a storing buffer for storing the new word to be saved in the memory;
a storing means for storing an address in the memory of the new word to be saved;
an address counter for scanning addresses of all of the words in the set of words, and for applying the scanned addresses to the memory as read addresses;
a comparison circuit for comparing each scanned address applied to the memory and the address of the new word to be saved; and
a multiplexer circuit comprising:
a first input linked to a read output of the memory,
a second input linked to an output of the storing buffer,
an output linked to the second signature circuit, and
a control input controlled by the comparison circuit, such that the multiplexer circuit replaces with the new word, at an input of the second signature circuit, the write target word, when the scanned address supplied by the address counter is equal to the address of the new word to be saved.

16. The device according to claim 10, further comprising:
means for intercepting a command for reading a read target word in the memory zone applied to the memory, wherein the means for reading, in response to the command for reading, reads all of the words in the set of words present in the memory zone, and applies the words read to the first signature calculation circuit to calculate the first current cumulative signature according to the words read; and
means for triggering a specific read-protect action if the first current cumulative signature does not correspond to an expected signature.

17. The device according to claim 16, wherein the specific read-protect action comprises at least one of the following actions or a combination of the following actions: preventing the read target word from being supplied to an external environment of the memory, activating an alert signal, disabling the memory, and erasing the content of the memory zone.

18. The device according to claim 10, wherein the cumulative signatures are calculated with an invariable signature generation algorithm, or an algorithm using an invariable signature key, such that the first current cumulative signature corresponds to an expected signature if the first current cumulative and expected signatures are identical.

19. A method for securing a data memory in which individually read-accessible words are saved, comprising:
defining in the memory a memory zone storing a set of words;

receiving a write request to write a new word in the memory zone in place of a write target word of the set;

in response to receiving the write request, reading all of the words of the set; and simultaneously calculating a first current cumulative signature and a second current cumulative signature, the first current cumulative signature being calculated as a function of all of the words in the set, and the second current cumulative signature being calculated as a function of the new word and all of the words in the set except for the write target word, wherein the new memory zone is scanned during the current cumulative signature calculations, at a faster rate than a rate of writing in the memory.

20. The method according to claim 19, further comprising writing the new word in the memory zone in place of the write target word prior to completing the calculating steps.

21. The method according to claim 19, wherein the writing of a new word in the memory zone further comprises storing the second current cumulative signature as an expected signature of the memory zone.

22. The method according to claim 19, further comprising triggering a specific write-protect action if the first current cumulative signature does not correspond to an expected signature.

23. The method according to claim 22, wherein the specific write-protect action comprises at least one of the following actions or a combination of the following actions: preventing the writing of the new word in the memory, preventing the storing of the second current cumulative signature as a new expected signature, activating an alert signal, read- and/or write-disabling the memory, and erasing the memory zone.

24. The method according to claim 19, wherein the second current cumulative signature is calculated before the new word is written in the memory zone.

25. The method according to claim 19, wherein the write target word is replaced with the new word using a multiplexer circuit arranged in a private path for reading words and having a first input linked to a read output of the memory and a second input linked to an output of a storing buffer for storing the new word.

26. The method according to claim 19, further comprising:

receiving a read request to read a read target word in the memory zone;

in response to receiving the read request, reading all of the words present in the memory zone;

calculating the first current cumulative signature according to all of the words read; and triggering a specific read-protect action if the first current cumulative signature does not correspond to an expected signature.

27. The method according to claim 26, wherein the specific read-protect action comprises at least one of the following actions or a combination of the following actions: preventing the read target word from being supplied to an external environment of the memory, activating an alert signal, read- and/or write-disabling the memory, or erasing the memory zone.

28. A device to secure a data memory, the device comprising:

a first signature calculator;

a second signature calculator; and a controller configured to respond to a request to replace a target word in a set of words in a defined memory zone with a new word by simultaneously causing:

the first signature calculator to calculate a first cumulative signature based on the set of words in the defined memory zone; and the second signature calculator to calculate a second cumulative signature based on the set of words in the defined memory zone with the target word replaced with the new word, wherein the memory zone is scanned during the current cumulative signature calculations, at a faster rate than a rate of writing in the memory.

29. The device of claim 28, further comprising a signature storage memory configured to store expected signatures associated with sets of words.

30. The device claim 28, further comprising:

a multiplexer comprising:

a first input linked to a read output of the data memory, a second input configured to receive the new word; and an output linked to the second signature calculator, wherein the multiplexer is configured to replace with the new word, at an input of the second signature calculator, the write target word.

31. A system, comprising:

a data memory;

a device configured to secure the data memory, the device comprising:

a first signature calculator;

a second signature calculator; and a controller configured to respond to a request to replace a target word in a set of words in a defined memory zone with a new word by simultaneously causing:

the first signature calculator to calculate a first cumulative signature based on the set of words in the defined memory zone; and the second signature calculator to calculate a second cumulative signature based on the set of words in the defined memory zone with the target word replaced with the new word, wherein the memory zone is scanned during the current cumulative signature calculations, at a faster rate than a rate of writing in the memory.

* * * * *